WAVE TRAP BY PARALLEL SUB-CONDUCTORS

Filed Oct. 3, 1960

Inventors
Hiroshi Nakamura
Yoshitsugu Sawada
by George B. Oujevolk
Attorney

United States Patent Office 3,181,092
Patented Apr. 27, 1965

3,181,092

WAVE TRAP BY PARALLEL SUB-CONDUCTORS

Hiroshi Nakamura and Yoshitsugu Sawada, Tokyo, Japan, assignors to Zaidan Hojin Denryoku Chuo Kenkyujo (known as Central Research Institute of Electric Power Industry), Tokyo-to, Japan Filed Oct. 3, 1960, Ser. No. 60,077
2 Claims. (Cl. 333—73)

The present invention relates to a wave trap for high frequency wave propagating along electric power transmission and distribution lines.

Hitherto, as the circuit described above, the so-called blocking coil system comprising an inductance coil connected in series to the electric power transmission line to be compensated by a condenser connected in parallel to said inductance coil, said coil and condenser being made to achieve a parallel resonance at a frequency to be trapped, has been adopted. According to this system, however, when the electric current of the transmission line is great, an inductance coil of very large scale must be used and moreover, manufacturing of said coil is very difficult when the frequency to be trapped is very high owing to the great stray capacity of the inductance coil itself.

An object of this invention is to provide an electric circuit for trapping any high frequency wave, which has no such disadvantages as described above. Said object and other objects of this invention have been attained by stretching at least one sub-conductor about $\lambda/4$ in length ($\lambda$: wave length of the high frequency wave to be trapped) at a certain distance, along the transmission line and inserting proper impedance elements between said sub-conductor and transmission line or in the sub-conductor itself at its proper place to form an electric band eliminating filter.

The above and other novel features of this invention will be more fully understood by reference to the following examples taken in conjunction with the drawing in which the same or similar members are indicated by the same numerals and references, and in which.

Figure 1:
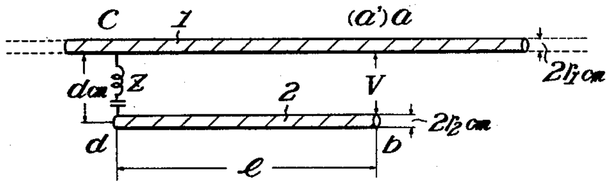
FIG. 1 is a schematic connection diagram of an example of this invention, which is applied to one phase of an electric power line.

Referring to FIG. 1, a sub-conductor 2 having length of $l$ cm. and radius of $r_2$ cm. is stretched parallel to a main transmission conductor 1 having radius of $r_1$ cm. at a distance of $d$ cm. from said conductor 1, an end of the sub-conductor 2 is connected to the main conductor 1 through an impedance Z.

The principle of the operation of the circuit of FIG. 1 will be described in the following description in connection with FIG. 2. In FIG. 2(A), let it be assumed that the voltage between the points $a$ and $b$ is V volts and this voltage is divided into $\nu_p V$ and $(1-\nu_p)V$ at the point O. In this case, the potential of the point $a$ relative to the point O becomes equal to that of the point $a'$, so that we can regard the circuit as the state wherein the points $a$ and $a'$ are directly connected to each other. On the other hand, since the end point $b$ is in opened state, the electric current at said point $b$ is zero. This state is equivalent to the condition that zero phase sequence electric currents $(1-\nu_p)I$ and $\nu_p I$ are, respectively, passed through the main conductor and sub-conductor 2, so that at the point O, the following relation is established.

$$(1-\nu_p)I+\nu_p I=I$$

Accordingly, it will be understood that the circuit of

FIG. 2(A) includes a zero-phase sequence in which an electric current I is made to pass against the voltage $\nu_p V$ as is shown in FIG. 2(B). Referring to the positive phase sequence, an electric voltage of V volts is applied to the open ends $b$ and $a'$ of two conductors, whereby a positive phase sequence current of $\nu_p I$ is made to pass as is shown in FIG. 2(C).

Now, if it is assumed that the impedance viewed from the ends $b$ and $a'$ is $Z_b$, the following relation is obtained.

$$\frac{V}{\nu_p I}=Z_b,\ \therefore \frac{V}{I}=\nu_p Z_b$$

On the other hand, if it is assumed that the impedance between the points $a$ and $a'$, $b$ of the zero phase sequence is $Z'$, the following relation will be obtained.

$$Z'=\frac{\nu_p V}{I}=\nu_p(\nu_p Z_b)=\nu_p^2 Z_b$$

In this case, such an equivalent circuit as is shown in FIG. 2(D) is obtained, wherein $Z_b$ is an input impedance of the positive phase sequence system, i.e., a four terminal circuit in which the voltages between the two conductors and a neutral, such as ground, are substantially equal in the absolute values and opposite in phase angles, and $\nu_p$ is a constant determined by the number $n$ of the sub-conductors. Accordingly, if said factors $Z_b$ and $\nu_p$ are selected so as to be sufficiently large for trapping the high frequency wave, objects of this invention will be attained. When length $l$ of the sub-conductor is selected so as to be equal to $$\frac{\lambda}{4}$$

($\lambda$: wave length of the high frequency wave to be trapped), its equivalent impedance can be made sufficiently high. Moreover, if the impedance Z inserted between the main conductor and sub-conductor is properly selected the frequency band to be trapped can be broadened.

Figures 2, 3, 4:
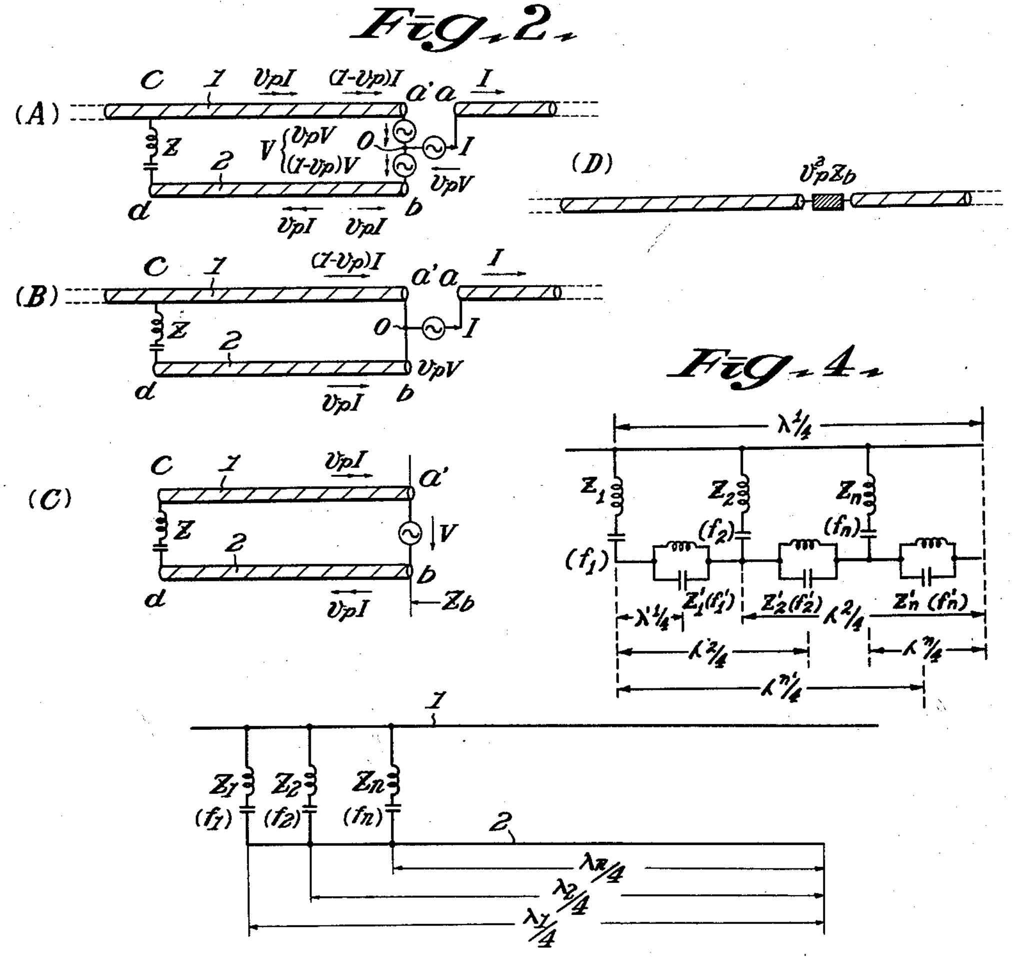
FIG. 2 is schematic connection diagrams for describing operations of the example of FIG. 1.
FIGS. 3 and 4 are connection diagrams of another example of this invention.

For attaining greater broadening of the frequency band (for wave length $\lambda_1$ to other wave length $\lambda_2$) to be trapped, it is necessary, as is shown in FIGS. 3 and 4 to connect a suitable impedance $Z_1$ to one end of the sub-conductor 2 having a length of $$\frac{\lambda_1}{4}$$

as well as to connect suitable impedances $Z_2 \ldots Z_n$, respectively, to the points distanced from the other end of said sub-conductor, respectively, by the distance $$\frac{\lambda_2}{4}, \ldots, \frac{\lambda_n}{4}$$

The relation between the characteristic impedance $Z_1$ of the positive phase sequence system and the distribution rate $\nu_p$ of the potential is represented by the following equations.

$$Z_1=138\frac{n+1}{n}\log_{10}\frac{\alpha}{\sqrt[n+1]{n r_1^n r_2}}$$

$$\nu=\frac{n}{n+1}\cdot\frac{\log_{10}\frac{d}{r_1}}{\sqrt[n+1]{n r_1^n r_2}}$$

Accordingly, with the increase of the number $n$ of sub-conductors, the characteristic impedance $Z_1$ decreases, and the distribution rate $\nu_p$ approaches to 1.

In a most simple case wherein $n=1$, $r_1=r_2=r$, the following relation is established.

$$Z_1=276\log_{10}\frac{d}{r};\ \nu_p=\frac{1}{2}$$

$Z_1, Z_2, \ldots Z_n$ are series resonance circuits realized by series connections of inductance coils (having some resistances) and capacitors. $Z_1'$, $Z_2'$, . . . $Z_n'$ are parallel resonance circuits realized by parallel connections of inductance coils (having some resistances) and capacitors.

According to this invention, it is clear that the circuit becomes very simple and a sufficiently favorable character for trapping high frequency wave can be obtained without incurring any troublesome effects due to the great power current or stray capacity of the inductance coil itself.

What we claim is:

1. An electrical circuit for trapping a high frequency wave of a certain band width composed of one frequency of a maximum wave length and other frequencies in said band of lesser wave lengths propagated along a main power line conductor, comprising in combination; at least one auxiliary line sub-conductor arranged parallel to said power line at a suitable distance therefrom of a length equal to one-quarter the length of the wave of the maximum wave length; connecting means substantially at right angles to said power line and said auxiliary line connecting one end of said sub-conductor to said power line; additional connecting means corresponding to each of the higher frequencies of said lesser wave lengths disposed substantially parallel to said first connecting means between said power line and points on said sub-conductor which are at one-quarter wave length distance from the other end of said sub-conductor and, impedance means in series with each of said connecting means and said sub-conductor.

2. A circuit as claimed in claim 1, said impedance means being disposed in said connecting means.

References Cited by the Examiner

UNITED STATES PATENTS

| | | | |
|---|---|---|---|
| 2,159,648 | 5/39 | Alford | 333—73 |
| 2,176,211 | 10/39 | Cork | 333—73 |
| 2,190,131 | 2/40 | Alford | 333—73 |
| 2,201,326 | 5/40 | Trevor | 333—73 |
| 2,238,904 | 4/41 | Lindenblad | 333—73 |
| 2,267,446 | 12/41 | Cork | 333—73 |
| 2,275,587 | 3/42 | Gluyas | 333—73 |
| 2,321,521 | 6/43 | Salinger | 333—73 |
| 2,546,322 | 3/51 | Smith | 333—73 |
| 2,751,557 | 6/56 | Sosin | 333—73 |
| 2,762,017 | 9/56 | Bradburd | 333—73 |

HERMAN KARL SAALBACH, *Primary Examiner.*

ELI J. SAX, *Examiner.*